United States Patent
Bell (10) Patent No.: US 12,241,201 B2
(45) Date of Patent: Mar. 4, 2025

(54) CARPET TILES FOR MINIMALLY PREPARED SUBFLOORS AND METHODS OF MAKING THE SAME

(71) Applicant: Aladdin Manufacturing Corporation, Calhoun, GA (US)

(72) Inventor: Michael E. Bell, Glasgow, VA (US)

(73) Assignee: Aladdin Manufacturing Corporation, Calhoun, GA (US)

( * ) Notice: Subject to any disclaimer, the term of this patent is extended or adjusted under 35 U.S.C. 154(b) by 83 days.

(21) Appl. No.: 17/760,059

(22) PCT Filed: Feb. 3, 2021

(86) PCT No.: PCT/US2021/016291
§ 371 (c)(1),
(2) Date: Aug. 3, 2022

(87) PCT Pub. No.: WO2021/158584
PCT Pub. Date: Aug. 12, 2021

(65) Prior Publication Data
US 2022/0396915 A1    Dec. 15, 2022

Related U.S. Application Data

(60) Provisional application No. 62/969,870, filed on Feb. 4, 2020.

(30) Foreign Application Priority Data

Mar. 4, 2020   (EP) ..................................... 20161004

(51) Int. Cl.
*B29C 65/00*     (2006.01)
*B32B 37/10*     (2006.01)
(Continued)

(52) U.S. Cl.
CPC ........... *D06N 3/0036* (2013.01); *B32B 37/10* (2013.01); *B32B 37/153* (2013.01);
(Continued)

(58) Field of Classification Search
CPC ........ B29C 65/004; B29C 65/48; B32B 37/10
See application file for complete search history.

(56) References Cited

U.S. PATENT DOCUMENTS 3,309,259 A    3/1967    Schwartz
3,887,422 A    6/1975    Bosniack
(Continued)

FOREIGN PATENT DOCUMENTS

CA        2410155      12/2001
CN        101472510    7/2009
(Continued)

OTHER PUBLICATIONS

Extended European Search Report for European Patent Application No. 20161004.5, dated Oct. 9, 2020, (8 pages), European Patent Office, Munich, Germany.
(Continued)

*Primary Examiner* — Philip C Tucker
*Assistant Examiner* — Nickolas R Harm
(74) *Attorney, Agent, or Firm* — Meunier Carlin & Curfman LLC (57) ABSTRACT

A carpet tile and process for making the same, wherein the carpet tile comprises a facecloth having a plurality of face yarns tufted through a primary backing, an extruded polymer secondary backing layer, and a cushion, comprising a reinforcing scrim layer within a polymer layer. The top surface and bottom surface of the carpet tile are defined by the facecloth and the cushion, respectively. A polymer-based resin is extruded onto the facecloth to form an at least substantially uniform secondary backing layer, and the cush-
(Continued)

ion is laid onto the extruded polymer secondary backing layer while the extruded polymer secondary backing layer remains above a softening temperature for the resin. The entire multi-layer web is then passed through a nip to embed the reinforcing scrim layer into the extruded polymer secondary layer, and the entire web is chilled.

19 Claims, 4 Drawing Sheets

(51) Int. Cl.
    B32B 37/15      (2006.01)
    D06N 3/00       (2006.01)
    D06N 7/00       (2006.01)
    B29C 65/48      (2006.01)
    B32B 37/24      (2006.01)
    B32B 37/26      (2006.01)

(52) U.S. Cl.
    CPC ......... *D06N 7/0076* (2013.01); *D06N 7/0081* (2013.01); *D06N 7/0086* (2013.01); *B29C 65/004* (2013.01); *B29C 65/48* (2013.01); *B32B 2037/243* (2013.01); *B32B 2037/266* (2013.01); *B32B 2305/022* (2013.01); *B32B 2305/188* (2013.01); *B32B 2305/20* (2013.01); *B32B 2367/00* (2013.01); *B32B 2471/02* (2013.01); *D06N 2203/061* (2013.01); *D06N 2209/1628* (2013.01); *D06N 2209/1671* (2013.01)

(56) References Cited

U.S. PATENT DOCUMENTS

| | | | |
|---|---|---|---|
| 3,922,454 A | 11/1975 | Roecker | |
| 4,305,986 A | 12/1981 | Hartmann et al. | |
| 5,204,155 A | 4/1993 | Bell et al. | |
| 5,834,087 A | 11/1998 | Kajikawa et al. | |
| 6,344,254 B1 | 2/2002 | Smith et al. | |
| 6,740,385 B2 | 5/2004 | Gardner et al. | |
| 7,115,315 B2 | 10/2006 | Fowler | |
| 7,338,698 B1 | 3/2008 | Bieser et al. | |
| 8,083,875 B2 | 12/2011 | Sheppard et al. | |
| 8,613,406 B2 | 12/2013 | Jones et al. | |
| 8,617,686 B2 | 12/2013 | Pepper et al. | |
| 9,376,766 B2 | 6/2016 | Hobbs et al. | |
| 11,260,621 B2 | 3/2022 | Gallman et al. | |
| 11,649,587 B2 | 5/2023 | Gallman et al. | |
| 2003/0072911 A1 | 4/2003 | Higgins et al. | |
| 2003/0152741 A1 | 8/2003 | Robbins et al. | |
| 2003/0152742 A1 | 8/2003 | Shimizu et al. | |
| 2006/0014901 A1 | 1/2006 | Hassan et al. | |
| 2006/0251853 A1 | 11/2006 | Ingram | |
| 2007/0254131 A1 | 11/2007 | Shail et al. | |
| 2007/0286982 A1 | 12/2007 | Higgins et al. | |
| 2008/0213515 A1 | 9/2008 | Vey et al. | |
| 2008/0233336 A1 | 9/2008 | Giannopoulos et al. | |
| 2010/0170991 A1 | 7/2010 | Hobbs et al. | |
| 2010/0260966 A1 | 10/2010 | McGill | |
| 2011/0189427 A1 | 8/2011 | Wells et al. | |
| 2012/0117777 A1 | 5/2012 | Jones et al. | |
| 2014/0134386 A1 | 5/2014 | Brumbelow et al. | |
| 2015/0176201 A1 | 6/2015 | Flendrig et al. | |
| 2016/0032521 A1 | 2/2016 | Arvidson et al. | |
| 2018/0282942 A1 | 10/2018 | Segars et al. | |
| 2019/0077114 A1 | 3/2019 | Gallman et al. | |
| 2019/0309469 A1 | 10/2019 | Wever | |
| 2020/0308762 A1 | 10/2020 | Gallman et al. | |
| 2023/0304220 A1 | 9/2023 | Gallman et al. | |

FOREIGN PATENT DOCUMENTS

| | | |
|---|---|---|
| DE | 3905157 | 10/1989 |
| EP | 0321978 | 6/1989 |
| EP | 1023485 | 8/2000 |
| EP | 2396461 | 12/2011 |
| EP | 3647484 A1 | 5/2020 |
| EP | 3848193 | 7/2021 |
| EP | 3862482 | 8/2021 |
| GB | 1289921 A | 9/1972 |
| WO | 1999055954 | 11/1999 |
| WO | 2016018670 | 2/2016 |
| WO | 2019055461 | 3/2019 |

OTHER PUBLICATIONS

International Search Report and Written Opinion for International Application No. PCT/US2021/016291, dated Apr. 15, 2021, (10 pages), United States Patent and Trademark Office, Commissioner for Patents, Alexandria, Virginia, US.

International Search Report and Written Opinion issued in PCT/US2021/048882, mailed Nov. 22, 2021, 10 pages.

U.S. Appl. No. 15/703,195, Final Office Action mailed Oct. 21, 2019.

U.S. Appl. No. 15/703,195, Non-Final Office Action mailed Apr. 4, 2019.

U.S. Appl. No. 15/703,195, Requirement for Restriction/Election mailed Jan. 2, 2019.

WIPO Application No. PCT/US2018/050577, PCT International Search Report and Written Opinion of the International Search Authority mailed Dec. 12, 2018.

Final Office Action for U.S. Appl. No. 15/703,195, Oct. 28, 2020, (10 pages), United States Patent and Trademark Office, USA.A.

Final Office Action issued in co-pending U.S. Appl. No. 18/296,757, mailed Jul. 26, 2024.

Applicant-Initiated Interview Summary issued in co-pending U.S. Appl. No. 18/296,757, mailed Oct. 8, 2024.

Non-Final Office Action issued in U.S. Appl. No. 18/296,757, mailed Dec. 22, 2023.

Extended European Search Report for European Patent Application No. 20154810.4, dated Apr. 23, 2020, (7 pages), European Patent Office, Munich, Germany.

International Search Report and Written Opinion issued in PCT/US2021/12255, mailed Mar. 25, 2021, 9 pages.

Providing a continuous facecloth web comprising a primary backing having a plurality of face yarns extending therethrough

402

Advancing the facecloth web in an inverted orientation along a web travel path

403

Extruding a continuous sheet of polymer secondary backing material onto a surface of the facecloth web

404

Laying a cushion onto an exposed surface of the extruded polymer secondary backing while the extruded polymer secondary backing remains above a softening temperature to form a multi-layer web

405

Advancing the multi-layer web through a nip to bind the cushion to the extruded polymer secondary backing

406

Advancing the multi-layer web through one or more chilling rollers to cool the multi-layer web

Fig. 4

CARPET TILES FOR MINIMALLY PREPARED SUBFLOORS AND METHODS OF MAKING THE SAME

CROSS REFERENCE TO RELATED APPLICATIONS

The present application is a 35 U.S.C. § 371 national stage of International Application No. PCT/US2021/016291, filed Feb. 3, 2021, which claims the benefit of priority to U.S. Patent Application No. 62/969,870 filed on Feb. 4, 2020, and European Patent Application No. 20161004.5 filed on Mar. 4, 2020, the contents of which are hereby incorporated by reference in their entirety for all purposes.

BACKGROUND

The installation techniques traditionally used to install modular carpet components such as carpet tiles puts a large emphasis on the need to ensure that each component is individually flat when installed. Whereas the edges of larger broadloom carpet installations may be positioned adjacent walls and/or may be specifically pinned to a subfloor, the edges of at least some smaller carpet tiles are generally exposed (possibly in the center of a room or high-traffic area) and may not be directly secured relative to their respective neighboring tiles. Thus, manufacturers of carpet tiles must ensure that these tiles do not curl (such that the carpet tile edges curl upward away from the subfloor) or dome (such that the middle of the carpet tile moves upward away from the subfloor) once installed. Each of these possible defects may create trip hazards for individuals walking along the tiled floor, or may create unsightly gaps between adjacent tiles. Even when each carpet tile is individually secured to the underlying subfloor (e.g., via an adhesive), internal forces within the carpet tile tending to curl or dome may cause portions of the tile to break away from the adhesive and the subfloor.

Further, carpets on top of a wet subfloor, particularly for an extended period of time, may be subject to a number of issues. One is that the carpet may develop mold or mildew. The presence of mildew in an area can cause respiratory issues for anyone who inhales mildew spores. Mold can cause even more severe health issues, such as long-term respiratory and cardiovascular issues, as well as causing structural damage. Mold and mildew may be more likely to develop in a carpeted area, compared to the same area without carpet, as moisture may become trapped under the carpet. Further, the presence of moisture may weaken adhesive that binds layers of carpet together, decreasing its usable life. Carpet in which the layers may move relative to one another can also pose a slip-and-fall danger. Moisture-related problems are particularly acute when carpet is on top of a concrete subfloor.

Additionally, traditional carpet installation has demanded a high level of preparation, especially when new carpet replaces existing carpet or other type of flooring. Specifically, when carpet or carpet tiles are installed over remnants of previous installation materials either to reduce installation time or labor or both, old adhesives and other chemicals that may have migrated into the old adhesives remain underneath the new flooring. These old adhesives or other chemicals may further migrate into the new flooring, creating quality problems and resulting in an unacceptable appearance. This may also cause safety concerns causing the carpet tiles to come loose, and causing the edges to protrude up into high traffic areas, perhaps additionally creating slip and trip hazards for end users.

Furthermore, typical cushioned carpets or carpet tiles have multiple secondary polymer layers and a stabilizing layer. This may mean that cushioned carpets or carpet tiles are typically heavier and more expensive to ship and install.

Accordingly, a need exists for alternative carpet tiles, that in accordance with preferred embodiments solve one or more of the problems associated with the carpet tiles of the state of the art. Furthermore, a need exists for durable carpet tiles with cushion having desirable flatness characteristics and/or ability to prevent mold and mildew buildup, and other damage, due to moisture, and/or having the ability to be installed with minimal preparation. Furthermore, there is a need for a cushioned carpet or carpet tile and a method of manufacturing such a carpet or carpet tile with an alternative method, which in accordance with preferred embodiments solves one or more of the problems with the manufacturing methods of the state of the art.

BRIEF SUMMARY

Various embodiments are directed to a carpet tile comprising a tufted primary backing defining a top wear surface comprising a plurality of tufted fibers. The opposite, backside of the primary backing may be coated with a pre-coat layer to lock the carpet tufts into the primary backing. The coated primary backing has an extruded polymer secondary backing secured thereto, and the extruded polymer secondary backing has a cushion bound thereto to define the bottom surface of the carpet tile.

Various embodiments are directed to a carpet tile comprising a facecloth comprising a primary backing and a plurality of face yarns extending through the primary backing, wherein the facecloth defines an upper surface of the carpet tile; an extruded polymer secondary backing layer bonded to the facecloth; and a cushion bonded to the bottom surface of the extruded polymer secondary backing, said cushion comprising a reinforcing scrim layer embedded within a polymer layer, preferably a polyester layer; and wherein the cushion defines at least a portion of a bottom surface of the carpet tile.

In general, in the context of the present invention, said cushion may be a layer comprising a polymer area or layer and/or comprising a foamed area or layer having a hardness below half of the hardness of the secondary backing, as expressed by the Shore 00 scale.

In an embodiment, the cushion bonded to the bottom surface of the extruded polymer secondary backing preferably includes a polymer layer, which may preferably be a polyester layer. The reinforcing scrim layer, if present, is embedded in the polyester layer. The polyester layer allows any moisture content in the subfloor to be wicked away from the subfloor and released through the seams of the carpet tile, thus preventing moisture buildup that may cause mold or mildew formation and doming or curling of the carpet tile due to moisture.

In certain embodiments, the cushion comprises a weight ratio of 3 to 30 oz per square yard, of which 0.25 to 2.5 oz per square yard is reinforcing scrim layer. In certain embodiments, the cushion comprises a weight ratio of polymer layer to reinforcing scrim layer of 12:1 to 120:1.

In certain embodiments, the reinforcing scrim layer comprises a plurality of fibers and wherein the plurality of fibers comprise at least one of: glass fibers or polymer fibers. In certain embodiments, the plurality of fibers comprise polymer fibers comprises sheathed polyester core fibers. In certain embodiments, the reinforcing scrim layer comprises a plurality of nonwoven fibers. In certain embodiments, the reinforcing scrim layer comprises a nonwoven fiber mat. In certain embodiments, the nonwoven fiber mat comprises an air-laid grid. In certain embodiments, the reinforcing scrim layer comprises a woven fiber mat. In certain embodiments, the reinforcing scrim layer comprises a plurality of polymer fibers and a plurality of glass fibers.

In certain embodiments, the extruded polymer secondary backing comprises a polyolefin. In certain embodiments, the extruded polymer secondary backing may comprise, for example, in an amount between about 10-40 wt % of the weight of the extruded polymer secondary backing. The extruded polymer secondary backing may additionally comprise an inert filler material in an amount between about 20-80 wt % of the weight of the extruded polymer secondary backing.

In certain embodiments, the weight of the carpet tile is between about 50-96 ounces per square yard. In certain embodiments, the weight of the carpet tile is between about 59-88 ounces per square yard.

In certain embodiments, the facecloth may additionally comprise a primary backing pre-coat layer between the primary backing layer and the extruded polymer secondary backing layer.

In certain embodiments, the extruded polymer secondary backing comprises a weight ratio of between about 15-60 ounces per square yard.

In certain embodiments, the carpet tile includes a cushion without a reinforcing scrim layer. In such an embodiment, the cushion can include a polymer layer, preferably a polyester foam layer, for instance, a polyester layer that is stabilized through thermal, chemical, or mechanical processes or a combination thereof, to achieve properties similar to those achieved with the reinforcing scrim layer.

Various embodiments are directed to a method of manufacturing a carpet tile, the method comprising providing a facecloth, wherein the facecloth comprises a primary backing having a plurality of face yarns extending through a facecloth, wherein in some embodiments a pre-coat layer has been applied to a first side of the facecloth; forming a multi-layer construction comprising the facecloth and a backing construction secured on the first side of the facecloth by: extruding a polymer secondary backing onto the first side of the facecloth; pressing a cushion against a bottom surface of the extruded polymer secondary backing to bond the cushion to the bottom surface of the extruded polymer secondary backing such that the cushion defines at least a portion of a bottom surface of the carpet tile; and, in certain embodiments, chilling the multi-layer construction, or cutting the carpet web into a plurality of carpet tiles. In certain embodiments, bonding the cushion to the extruded polymer secondary backing comprises compressing the multi-layer construction between nip rollers.

In certain embodiments, the cushion preferably includes a polyester-based or polyester cushion. In another embodiment, the cushion can include other foam materials, such as a urethane foam, a PVC foam, a polyethylene foam, and so on.

In certain embodiments, the cushion comprises 3 to 30 oz of foam per square yard, of which includes 0.25 to 2.5 oz of reinforcing scrim layer per square yard. In certain embodiments, the cushion comprises a weight ratio of polymer layer to reinforcing scrim layer of 12:1 to 120:1.

In some embodiments, the cushion is free from filling materials or comprises an amount of filling materials, such as chalk, sand, and the like, below 2 wt %. In some other embodiments, the cushion can include filling material based on the cushion type, for example, the filling material may be at or below 20 wt % for flexible urethane foam or flexible PVC foam to a level of 70 wt % for rigid urethanes, and in the range of 5-40 wt % for flexible PET cushions.

In certain embodiments, extruding the polymer secondary backing comprises extruding a polyolefin-based resin comprising between about 10-40 wt % polyolefin and between about 20-80 wt % of a filler material, measured as portions of the weight of the resin.

In certain embodiments, the reinforcing scrim layer comprises a nonwoven fiber mat. In certain embodiments, the nonwoven fiber mat comprises an air-laid grid. In other embodiments, the reinforcing scrim layer comprises a woven fiber mat. In certain embodiments, the reinforcing scrim layer comprises at least one of: fiberglass fibers or polymer fibers.

In certain embodiments, said steps for extruding a polymer secondary backing onto the first side of the facecloth and pressing a cushion against the extruded polymer secondary backing collectively form a backing construction having a weight between about 23-60 ounces per square yard. In certain embodiments, providing a facecloth comprises providing a primary backing web having a weight between about 18-40 ounces per square yard, or 28-60 ounces per square yard when precoated; and the multi-layer construction has a weight between about 38-85 ounces per square yard.

In certain embodiments, a pre-coat layer has been applied to a first side of the facecloth.

In certain embodiments, the extruded polymer secondary backing comprises a weight ratio of between about 15-60 ounces per square yard.

It is understood that where a parameter range is provided, all integers and ranges within that range, and tenths and hundredths thereof, are also provided by the embodiments. For example, "5-10%" includes 5%, 6%, 7%, 8%, 9%, and 10%; 5.0%, 5.1%, 5.2% . . . 9.8%, 9.9%, and 10.0%; and 5.00%, 5.01%, 5.02% . . . 9.98%, 9.99%, and 10.00%, as well as, for example, 6-9%, 5.1%-9.9%, and 5.01%-9.99%. As another example, "at or below 20%" includes at or below 19%, at or below 18% . . . at or below 2%, and at or below 1%.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Various embodiments are directed to a dimensionally stable carpet tile that is resistant to both doming and curling, as well as to mold and mildew buildup. The carpet tile described in various embodiments herein also has the ability to be installed with minimal preparation. For example, the carpet or carpet tile described herein can be installed over remnants of previous installation materials, without fear of old adhesives or other chemicals migrating into the new carpet installation. This can have a substantially impact on installation time as well as on labor. Additionally, the carpet tile described herein provides cushioning and acoustic resistance, while having a high resistance to moisture.

The carpet tile is a multi-layer carpet tile comprising a facecloth (comprising a primary backing, face yarn, and optionally a pre-coat layer), bonded to a backing construction comprising an extruded polymer secondary backing layer and a cushion bonded to the extruded polymer secondary backing layer to define, at least in part, the bottom surface of the carpet tile. The cushion comprises a reinforcing scrim layer, usually a fibrous reinforcing scrim layer (e.g., woven or nonwoven) embedded within a polymer layer (which may be woven or nonwoven). The reinforcing scrim layer may also be an air-laid scrim. In certain embodiments, the cushion includes a polyester foam layer. In certain embodiments, the cushion comprises a weight ratio of 3 to 30 oz per square yard. In certain embodiments, the reinforcing scrim layer has a weight of 0.25 to 2.5 oz per square yard. Unless otherwise specified, the weights specified herein, such as the weight of the reinforcing scrim layer, indicate dry weights, although this does not preclude embodiments where the corresponding weights are wet weights.

The carpet tile product disclosed herein remains resistant to deformation (dimensional deformation, curling, or doming) due at least in part to the presence of the cushion on the bottom surface of the carpet tile. The product is resistant to mold and mildew buildup, due to its ability to wick moisture from the subfloor to the seams, where it may evaporate into the air.

Carpet Tile

Figure 1:
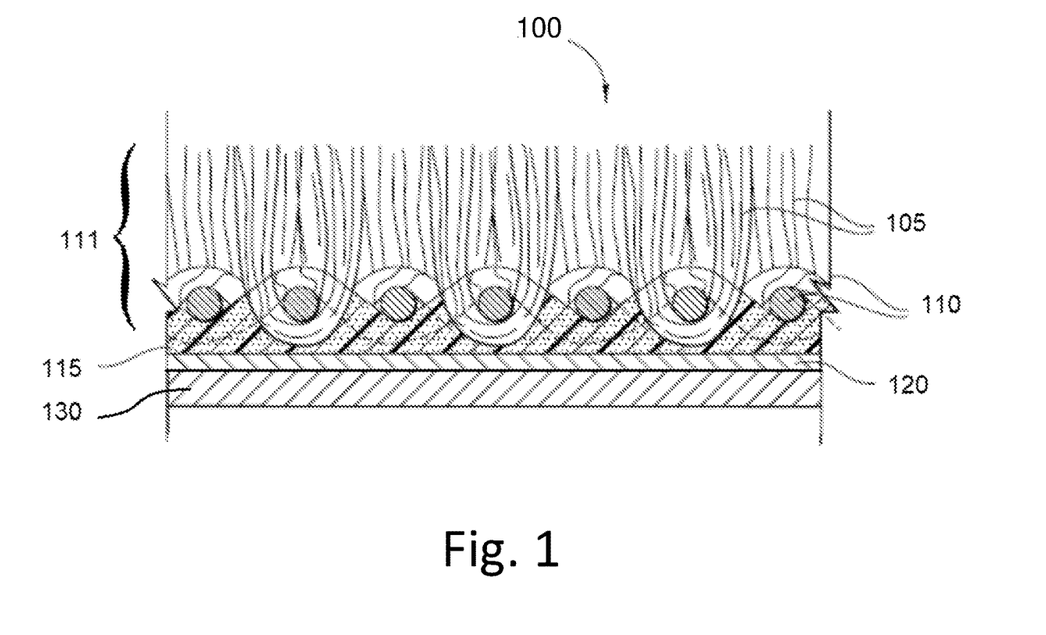
FIG. 1 is a side cutaway view showing various components of a carpet tile according to one embodiment.

Referring to the figures, in which like numerals refer to like elements through the several figures, FIG. 1 is a cross sectional view (not to scale) of a carpet tile 100 in accordance with various embodiments of the present invention. In the illustrated embodiment, the carpet tile 100 includes face yarn 105, which may be either tufted or woven into a primary backing 110 to form a facecloth 111. The face yarn 105 may be made from various materials, both natural and synthetic, such as nylon 6, nylon 6, 6, cotton, wool, nylon, acrylic, polyester, polyamides, polypropylene, and other polyolefins. The face weight of the face yarn 105 can be approximately 5 ounces per square yard to approximately 50 ounces per square yard.

The primary backing 110 may be formed from a substrate such as a woven substrate, a tape yarn substrate, and/or other substrate construction that imparts stability to the carpet tile 100. The substrate may be made from a polyester, such as poly(ethylene terephthalate) [PET], poly(trimethylene terephthalate) [PTT], poly(butylene terephthalate) [PBT], poly (ethylene terephthalate-co-isophthalate), poly(ethylene naphthalene dicarboxylate) [PEN], and copolymers thereof, and/or combinations thereof, with PET being preferred. In certain embodiments, the primary backing 110 may comprise a low melt polyester material configured to bind the various fibers together upon application of heat to the primary backing. The substrate may also comprise sheathed fibers, which may comprise a polyester core surrounded by a polyamide and/or polyolefin sheath. Typically, the polyester core may be made from PET, PTT, PBT, PEN, poly (ethylene terephthalate-co-isophthalate) and copolymers thereof. The polyamide sheath may be made from polycaprolactam [nylon 6], poly(7-heptanamide) [nylon 7], polycapryllactam [nylon 8], poly(9-nonanamide) [nylon 9], poly (tetramethylene adipamide) [nylon 4,6], poly (hexamethylene adipamide) [nylon 6,6], poly(methylene-4, 4'-dicyclohexylene dodecanediamide), poly(1,4-cyclohexylenedimethulene suberamide), poly(m-phenylene isophthalamide), and poly(p-phenylene terephthalamide), with polycaprolactam [nylon 6] being the preferred polyamide. In certain embodiments, the primary backing 110 may be formed using a woven substrate using any conventional natural or synthetic woven material, such as cotton, jute, rayon, paper, nylon, polypropylene and other polyolefins, polyamides, polyesters, and the.

The face yarn 105 may be tufted through the primary backing 110 so that the ends of the face yarn 105 extend in an outwardly direction from the topside of the primary backing 110 to form an upper surface of the carpet tile 100. Typically the face yarn is tufted into the primary backing 110 at a weight of approximately 2.6 ounces per square yard to approximately 5.9 ounces per square yard, and more preferably approximately 3 ounces per square yard. The tufting may be performed using conventional techniques that are well known in the art. Furthermore, the tufted face yarn 105 loops may be left as uncut to form an uncut pile carpet, cut to form a cut pile carpet, or partially cut to form a tip sheared carpet, as is well known in the art.

In certain embodiments, the facecloth 111 includes a pre-coat layer 115 that is applied to a first side of the facecloth, which is the same as the bottom surface of the primary backing 110. The pre-coat layer 115 penetrates the tufted face yarn 105 and encapsulates individual ends of the yarn bundles to at least partially bind the tufted face yarn 105 to the primary backing 110. This may prevent one end of an individual fiber from being pulled out of the carpet backing during the manufacturing process. The pre-coat layer 115 may also act as a tackifier to provide an acceptable binding surface for a subsequent polymer layer. In an exemplary embodiment, the pre-coat layer 115 comprises a hot melt adhesive (HMA) that contains a tackifying resin or agent alone or in combination with polyethylene. In various embodiments, the pre-coat layer 115 comprises an aqueous-latex based polymer configured to support the face yarn 105 within the primary backing 110 upon drying. In certain embodiments, the pre-coat layer 115 comprises butadiene acrylate based polymers, vinyl acetate ethylene, vinyl acetate-ethane copolymers, and/or latex based compounds, such as styrene butadiene copolymer latex (SBR latex). The pre-coat layer 115 may include one or more other compositions, such as inert filler materials (e.g., fly ash) as discussed in reference to the extruded polymer secondary backing layer 120 herein. The pre-coat layer 115 may also include one or more flame retardant materials such as, but not limited to, aluminum trihydrate (ATH) or magnesium hydroxide (MgOH) for applications where flame-retardancy is desired. One or more flame retardants may be necessary to comply with applicable regulations regarding the installation and/or usage of carpet tiles in certain applications, for example, when such carpet tiles are installed in transportation vehicles (e.g., buses, aircraft, and/or the like).

The pre-coat layer 115 may be applied to a bottom surface of the primary backing 110 in the range of approximately 2 ounces per square yard to approximately 20 ounces per square yard, and more preferably in the range of approximately 8 ounces per square yard to approximately 12 ounces per square yard.

Disposed on a bottom surface of the facecloth 111 is a backing construction comprising an extruded polymer secondary backing layer 120 and a cushion 130. The backing construction is arranged such that the extruded polymer secondary backing layer 120 is positioned between the cushion 130 and the facecloth 111. In such an embodiment, a first (top) side of the extruded polymer secondary backing layer 120 is bonded to the precoated facecloth 111, and a second (bottom) side of the extruded polymer secondary backing layer 120 is bonded to the cushion 130. The extruded polymer secondary backing layer 120 is embodied as a resin comprising one or more components collectively configured to give the resulting carpet tile 100 a flat overall appearance without substantial doming (a central portion of the carpet tile 100 rising relative to the edges such that a top surface of the carpet tile 100 is convex) or curling (the edges of the carpet tile 100 rising relative to the central portion such that a top surface of the carpet tile 100 is concave). The resin of the extruded polymer secondary backing layer 120 may comprise a polyolefin, a thermoplastic polymer, a mixture of two or more polyolefins, or a mixture of one or more polyolefins together with one or more other polymers. For example, the resin may comprise polyvinyl chloride, polyethylene, and/or polypropylene. As specific examples, a polyolefin polymer is embodied as 1-propene, ethylene copolymer or ethylene-propylene copolymer. In certain embodiments, the resin of the extruded polymer secondary backing layer 120 comprises the polymer mixture in an amount between about 10-40 wt % of the resin of the extruded polymer secondary backing layer 120 (and of the extruded polymer secondary backing layer 120 itself). In an embodiment, the carpet tile comprises a single extruded polymer secondary backing layer. In other embodiments, the carpet tile comprises multiple extruded polymer secondary backing layers.

The resin of the extruded polymer secondary backing layer 120 may additionally comprise one or more additives, such as an inert filler material, a colorant, an antioxidant, a tackifier, a viscosity modifier, a flame retardant, and/or the like.

The inert filler material may constitute the majority of the resin of the extruded polymer secondary backing layer 120 (by weight), and may function as a low cost material that adds weight to the extruded polymer secondary backing layer 120 to aid in forming an at least substantially flat carpet tile 100. For example, the inert filler material may constitute between about 20-80 wt % of the resin and/or the extruded polymer secondary backing layer 120.

The inert filler material may be made from carbonates such as calcium carbonate ($CaCO_3$), cesium carbonate ($CsCO_3$), strontium carbonate ($SrCO_3$), and magnesium carbonate ($MgCO_3$); sulfates such as barium sulfate ($BaSO_3$); oxides such as iron oxide ($Fe_2O_3$ or $Fe_3O_4$), aluminum oxide ($Al_2O_3$), tungsten oxide ($WO_3$), titanium oxide ($TiO_2$), silicon oxide ($SiO_2$); silicates, such as clay; metal salts; fly ash and the like.

Additionally, the inert filler material may be made from post-consumer products, such as post-consumer glass, post-consumer carpets and/or other post-consumer recycled materials. In cases where the inert filler is made from post-consumer glass, the post-consumer glass is ground into a fine glass powder before it is added as filler. The glass cullet may be made from automotive and architectural glass, also known as plate glass, flint glass, E glass, borosilicate glass, brown glass (bottle glass), green glass (bottle glass), or coal fly ash, or a combination thereof. In the case where post-consumer carpet is used as the inert filler material, the post-consumer carpet maybe ground into a fine cullet and added to the hot melt adhesive. In addition to the post-consumer carpet, remnants and trimmings of carpet (e.g., comprising trim waste from cutting carpet tiles from rolls of carpet, sometimes referred to as window waste), fine waste fibers that are a result of the shearing process, and the like, that are produced as a by-product during the manufacturing process may also be used to form the inert filler material.

The filled or unfilled polymer may also contain a colorant, such as carbon black or another colorant(s) to provide color and increase the opaqueness of the extruded polymer secondary backing layer 120. Typically, the colorant may be present in an amount less than or equal to approximately 1 wt % the filled or unfilled resin and extruded polymer secondary backing layer 120. For example, the colorant may be present in an amount between about 0.1-0.5 wt % of the extruded polymer secondary backing layer 120. As a specific example, the colorant may be present in an amount of approximately 0.1 wt % of the resin and the extruded polymer secondary backing layer 120.

Moreover, to reduce the possibility of thermo-oxidation degradation, the polymer may also contain one or more antioxidants. Some suitable antioxidants include, but are not limited to amines, 2,2'-methylene bis-(4-methyl-6-tert-butylphenol), 2,4,6-tri-tert-butylphenol, 2,6-di-tert-butyl-4-methylphenol, 4,4'-thio-bis-(6-tert-butyl-m-cresol), butylated hydroxy anisole, butylated hydroxy toluene, bis (hydrogenated tallow alkyl),oxide; tris(2,4-ditert-butylphenyl)phosphite and 1,3,5 triazine-2,4,6(1H, 3H, 5H)-trione,1,3,5,tris-((3,5-(1-dimethylethyl))-4-hydroxyphenyl) methyl. Typically, the antioxidant may be present in the filled or unfilled extruded polymer secondary backing layer 120 in an amount less than or equal to approximately 2 wt % of the resin and/or the extruded polymer secondary backing layer 120, such as between about 0.05-0.5 wt % of the resin and/or the extruded polymer secondary backing layer 120.

Moreover, the extruded polymer secondary backing layer 120 may additionally include one or more tackifiers to aid in forming a strong mechanical bond with the pre-coat layer 115 (if present), the primary backing 110, and/or the cushion 130 discussed in further detail below.

The resin of the polymer secondary backing layer 120 may additionally include one or more viscosity modifiers and/or compatibilizers, such as, for example, olefins of higher or lower molecular weight than the resin discussed herein or ethylene maleic anhydride copolymer, to ensure proper flow and bonding of the resin within filler and polymers when applying onto a facecloth 111. The viscosity modifier may be present in an amount between about 0.1-3 wt % of the resin and the extruded polymer secondary backing layer 120.

In certain embodiments, the resin of the extruded polymer secondary backing layer 120 may additionally comprise one or more flame retardants, such as, but not limited to, aluminum trihydrate (ATH), magnesium hydroxide (MgOH), various phosphorous based FR compounds such as Ammonium Polyphosphate, Ammonium Polypyrophosphate, silicone or siloxane flame retardants, or other flame retardants known in the trade, for applications where flame-retardancy is desired. One or more flame retardants may be necessary to comply with applicable regulations regarding the installation and/or usage of carpet tiles in certain applications, for example, when such carpet tiles are installed in transportation vehicles (e.g., buses, aircraft, and the like).

Referring again to FIG. 1, the carpet tile 100 additionally comprises a cushion 130 pressed against the extruded polymer layer 120 to define, at least in part, the bottom surface of the carpet tile 100. The cushion 130 imparts dimensional stability to the finished carpet tile 100. Because the cushion 130 is positioned on the bottom surface of the carpet tile 100, the cushion 130 provides additional support against curling and/or doming of the carpet tile.

Figure 2:
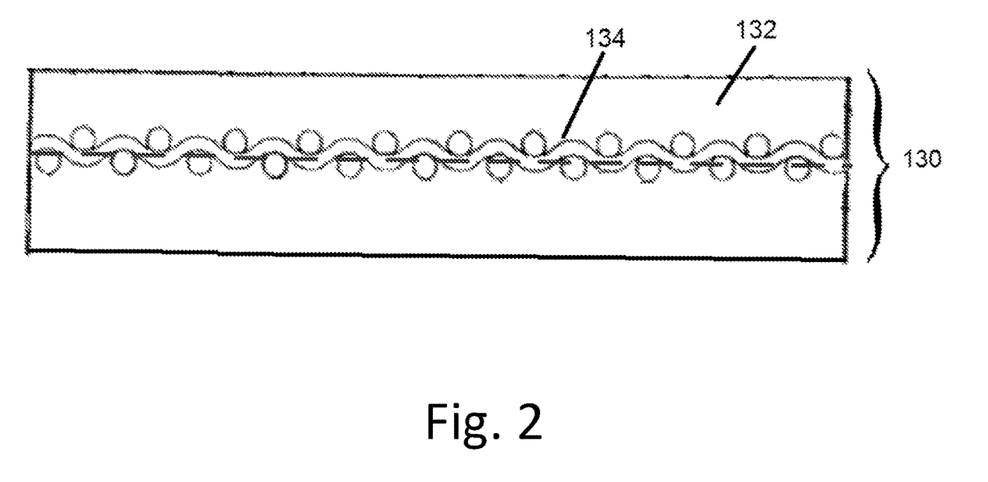
FIG. 2 is a cutaway view of the cushion portion of the carpet tile.

The cushion 130 comprises a polymer layer 132 with an integrated reinforcing scrim layer 134, as seen in FIG. 2. In an alternative embodiment (not pictured), the cushion 130 does not comprise a reinforcing scrim layer, and consists solely of a polymer layer 132. In such instances, the polymer layer may be stabilized to achieve properties similar to that of a polymer layer 132 with the reinforcing scrim layer 134 through thermal, chemical or mechanical process, or a combination thereof.

In an embodiment, the polymer layer 132 may comprise polyester. Such polyesters include, but are not limited to, PET, PTT, PBT, PEN, poly(ethylene terephthalate-co-isophthalate) and copolymers thereof. In a preferred embodiment, the polyester is PET. The polymer layer 132 may be woven or nonwoven. In a preferred embodiment, the polymer layer 132 is nonwoven.

In other embodiments, the polymer layer 132 may include any suitable material, such as PVC, polyurethane, polyethylene, and so on. The polymer layer 132 can include a foam type material or in some instances, can include non-foam type materials.

The reinforcing scrim layer 134, if present, may comprise a fibrous material provided in either a woven or non-woven configuration. When provided on the bottom surface of the carpet tile 100, the cushion 130 provides desirable protection against mold and mildew formation when the carpet tile 100 is on a wet subfloor. In an embodiment, the reinforcing scrim layer 134 is in the middle of the cushion 130, such that approximately half of the polymer layer 132 is on one side of the reinforcing scrim layer 134, and approximately half of the polymer layer 132 is on the other side of the reinforcing scrim layer 134. In other embodiments, about 0.1-99.9% of the polymer layer 132 is on one side of the reinforcing scrim layer 134, and about 99.9-0.1% of the polymer layer 132 is on the other side of the reinforcing scrim layer 134. In an embodiment, so little of the polymer layer 132 is on the top side of the reinforcing scrim layer 134 that the reinforcing scrim layer 134 is in contact with the extruded polymer layer 120. In an embodiment, a first side of the reinforcing scrim layer 134 is in contact with the extruded polymer layer 120, and a second side of the reinforcing scrim layer 134 is in contact with the polymer layer 132. In this embodiment, the polymer layer 132 may be in contact with the extruded polymer layer 120 due to the openness of the reinforcing scrim layer 134.

The reinforcing scrim layer 134 may contain fibrous materials, which themselves may constitute any number of natural or synthetic materials. The fibrous material may additionally and/or alternatively comprise one or more polymer based fibers, such as polyester fibers, polyamide fibers, polyurethane fibers, combinations thereof, and/or the like. For example, the polymer fibers may comprise polypropylene fibers, polyethylene fibers, sheathed polymer fibers (e.g., having a polyethylene core and a nylon or polypropylene sheath), and/or the like. As yet another example, the fibrous material may comprise a composite of polymer-based fibers and other fibers (e.g., glass fibers). Such a composite may comprise layers of non-woven and/or woven layers (e.g., a first layer comprising a polymer-based fiber material and a second layer comprising a glass fiber material).

Method of Manufacture

Figure 3:
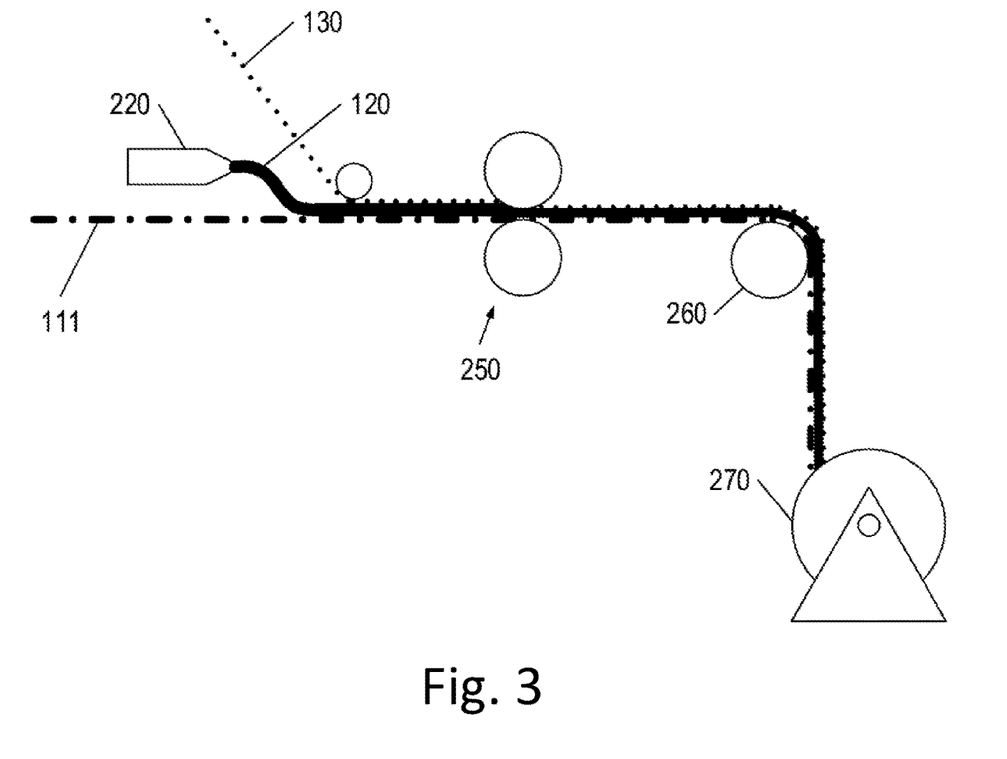
FIG. 3 is a schematic diagram of a portion of a manufacturing line utilized to produce carpet tiles according to various embodiments.

FIG. 3 is a schematic diagram of a portion of an example carpet tile manufacturing line that may be utilized to construct a carpet tile 100 as discussed herein, and FIG. 3 is a flow chart of an example method for constructing the carpet tile 100 according to certain embodiments. As discussed herein, the carpet tiles 100 may be manufactured as a portion of a continuous web and later cut into desired tile shapes and sizes. However, it should be understood that carpet tiles 100 may be manufactured according to any of a variety of manufacturing processes, such as a batch process in which each multi-layer carpet tile 100 is constructed as a separate component.

Figure 4:
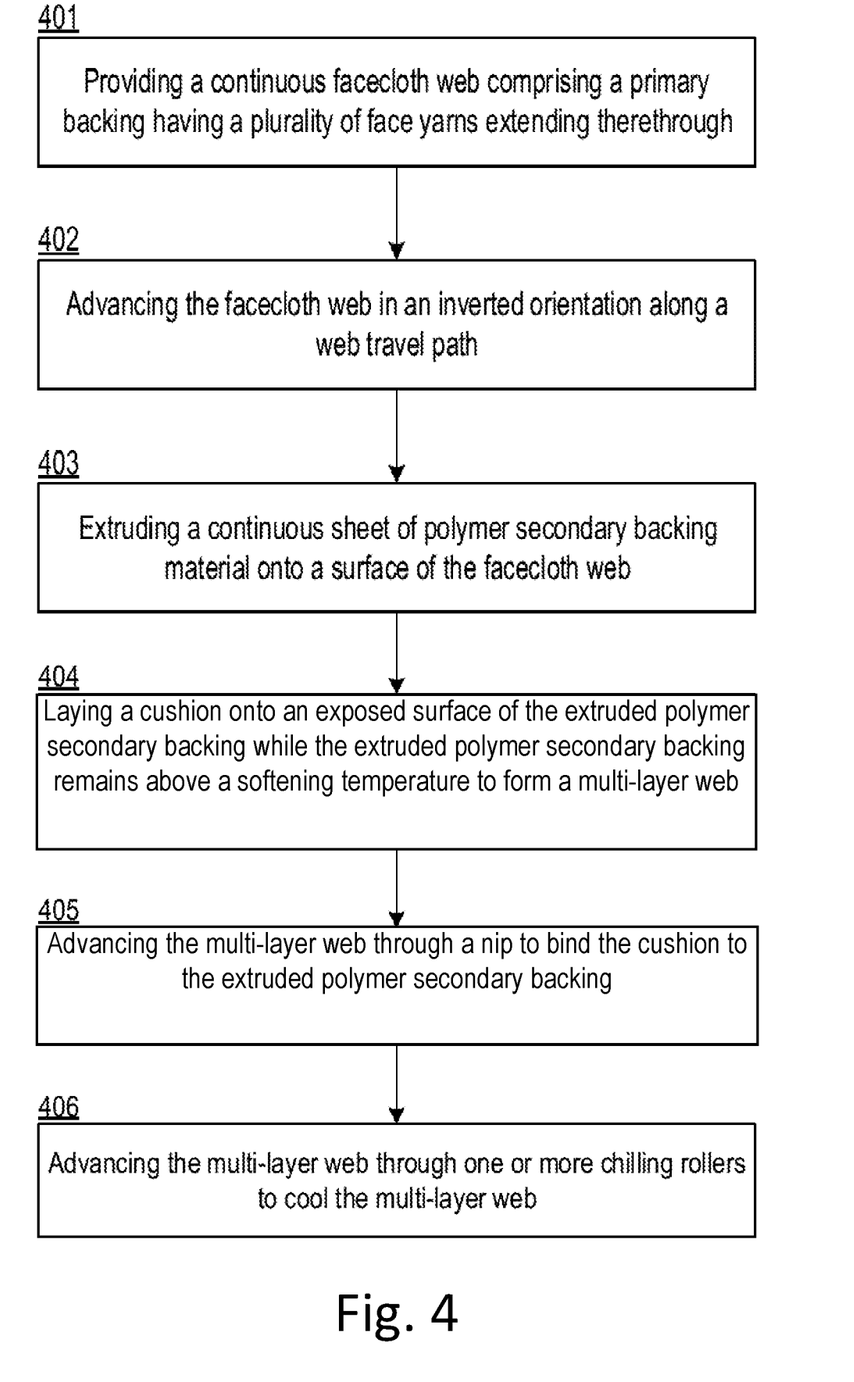
FIG. 4 is a flowchart showing various steps involved in production of a carpet tile according to various embodiments.

As shown in FIG. 3, the process begins by providing a facecloth 111 having a plurality of face yarns 105 extending through a primary backing 110 (as indicated at Block 401 of FIG. 4). The facecloth 111 can optionally have a pre-coat layer disposed on a backside of the primary backing 110. As discussed herein, the topside of the facecloth 111 ultimately forms the top surface of the completed carpet tile 100. As mentioned, the tufted primary backing 110 is provided as a continuous web, which may be threaded along a web travel path defined by a plurality of rollers (e.g., powered rollers and/or idler rollers). In certain embodiments, the facecloth 111 may have a width between 72-80 inches, although it should be understood that the facecloth 111 may have any width with suitable production equipment, such as up to 90, 100, 110, 120, 130, 140, 150, 160, 170, 180, 190, and 200 inches.

As shown in FIG. 3, the facecloth 111 is advanced along the web travel path in an inverted orientation with the backside of the facecloth 111 facing upward, as indicated at Block 402 of FIG. 4. The facecloth 111 is advanced past one or more extruder heads 220 configured to extrude a continuous sheet of a resin having an at least substantially uniform thickness onto the backside of the facecloth 111 to form the extruded polymer secondary backing layer 120, as indicated at Block 403. In certain embodiments, the extruder head 220 may comprise a single, elongated extrusion die tip opening extending across the entire width of the facecloth 111 such that the resin is extruded as a continuous sheet from the extruder head 220. Alternatively, the resin may be extruded from a plurality of extruder heads 220 positioned across the width of the web travel path. The plurality of extruder heads may be spaced such that the resin flows together to form an at least substantially continuous extruded polymer secondary backing layer 120 having an at least substantially uniform thickness across the width of the facecloth 111.

The one or more extruder heads 220 may be supplied by one or more extruders (e.g., single screw extruders and/or dual-screw extruders) configured to combine the various components of the resin prior to extrusion to form the extruded polymer secondary backing layer 120. Once combined, the extruders and one or more extruder heads 220 provide the at least substantially continuous sheet of resin onto the bottom surface of the facecloth 111 at a temperature between about 275-500 degrees Fahrenheit and at a weight of between about 8-35 ounces per square yard. In embodiments in which the facecloth 111 comprises a hot melt pre-coat layer 115, the resin may be applied to the facecloth 111 while the pre-coat layer 115 is sufficiently hot (as may be the case with a hot melt adhesive) so as to retain a tacky characteristic (e.g., while the pre-coat layer material remains above its softening point) to improve the mechanical bond strength between the facecloth 111 and the extruded polymer secondary backing layer 120. However, it should be understood that the resin need not be applied to the facecloth 111 while a pre-coat layer 115 remains hot in embodiments that do not utilize a hot melt adhesive pre-coat layer 115 (e.g., embodiments without a pre-coat layer 115 and embodiments using an aqueous latex-based pre-coat layer 115).

The hot melt pre-coat layer 115 could also be applied via other methods such as via roll coaters, via a spray system, or via a slot coater.

After extruding the resin of the extruded polymer secondary backing layer 120 onto the facecloth 111, the cushion 130 is laid onto the exposed bottom surface of the extruded polymer secondary backing layer 120 as indicated at Block 404 of FIG. 4. The extruded polymer secondary backing layer 120 remains above the resin softening point when the cushion 130 is laid onto the exposed surface of the extruded polymer secondary backing layer 120, and the entire multi-layer web (including the facecloth 111, the extruded polymer secondary backing layer 120, and the cushion 130) is passed through a nip 250 comprising two rollers positioned on opposite sides of the web travel path to compress the multi-layer web and to provide strong bonds between adjacent layers of the carpet tile 100. During compression, the extruded polymer secondary backing layer 120 is bonded to the facecloth 111, and the cushion 130 is bonded to the extruded polymer secondary backing layer 120 (as indicated at Block 405). The cushion 130 defines at least a portion of the bottom surface of the resulting carpet tile 100.

After the moving multi-layer web passes through the nip 250, the web passes through one or more chilling rollers 260 to cool and harden the extruded polymer secondary backing layer 120 (shown at Block 406). For example, the one or more chilling rollers 260 may be collectively configured to chill the extruded polymer secondary backing layer 120 to approximately room temperature (between about 75-80 degrees Fahrenheit).

In a non-pictured embodiment, the nip rollers may also serve as the chilling rollers.

The cooled multi-layer construction may then be passed to a tile cutting mechanism configured to cut the multi-layer web into a plurality of individual carpet tiles or to a take-up roller 270 for storage. For example the web may be passed into a die cutter to cut the material web into market-size carpet tiles 100 (e.g., 4"×8", 12"×36", 18"×18", 24"×24", or 36"×36"). The carpet tiles 100 can include square, rectangular, hexagonal or any other suitable shapes. Alternatively, the material web may be taken onto a large diameter (e.g., 8-foot diameter) drum where it can be taken to an off-line die cutting station for further processing into carpet tiles 100.

EXAMPLE 1

An example carpet tile is manufactured according to the methodology discussed herein. The example carpet tile comprises a facecloth 111 comprising a primary backing layer 110 having a weight of at least approximately 4 ounces per square yard, and having face yarns 105 tufted therethough at a weight of at least approximately 14 ounces per square yard. The tufted primary backing is coated with a pre-coat layer 115 having a dry weight of at least approximately 12 ounces per square yard.

The facecloth 111 is passed under an extruder head 220 as a part of a continuous web, where the resin of the extruded polymer secondary backing layer 120 is extruded onto a backside of the facecloth 111 (such that the resin is extruded onto the exposed surface of the pre-coat layer 115) to form the extruded polymer secondary backing layer 120. In this example, the extruded polymer secondary backing layer 120 comprises a polyolefin resin mixture heated to a temperature of 325-475 degrees Fahrenheit (163-246 degrees Celsius) for extrusion.

The resin is extruded in a continuous sheet onto the facecloth 111 to create an at least substantially uniform extruded polymer secondary backing layer 120 having an at least substantially uniform thickness.

Before the extruded polymer secondary backing layer 120 cools to a temperature below the softening point of the resin, a cushion 130 comprising a reinforcing scrim layer embedded within polyester is laid onto the exposed surface of the extruded secondary backing layer 120, and the entire multi-layer web is passed through a nip 250 and through one or more chilling rollers 260 to press the cushion 130 against the extruded polymer secondary backing layer 120 and to cool and harden the extruded polymer secondary backing layer 120. The cooled web is then cut into individual carpet tiles 100 for evaluation.

The carpet tile 100 provided according to this example construction exhibits superior ability to resist or prevent mold or mildew growth when placed on a wet subfloor, with desirable durability and a relatively low weight. The carpet tile 100 also additionally can be installed with no or minimum preparation to the subfloor, for example, without substantially removing all the remnants of a previous installation without the risk of adhesives or other chemicals from prior installations migrating into the carpet tile 100.

Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of manufacturing a carpet tile, the method comprising:
   providing a facecloth, wherein the facecloth comprises a primary backing having a plurality of face yarns extending through the facecloth;
   forming a multi-layer construction comprising the facecloth and a backing construction secured on a first side of the facecloth by:
   extruding a polymer secondary backing onto the first side of the facecloth such that a top surface of the polymer secondary backing is bonded to the facecloth; and
   pressing a cushion against a bottom surface of the extruded polymer secondary backing to bond the cushion to the bottom surface of the extruded polymer secondary backing such that the cushion defines at least a portion of a bottom surface of the carpet tile;

wherein said cushion comprises a reinforcing scrim layer embedded within a polymer layer and wherein the cushion comprises a weight ratio of polymer layer to reinforcing scrim layer of 12:1 to 120:1.

2. The method of claim 1, wherein the polymer layer of said cushion comprises a polyester layer.

3. The method of claim 1, wherein the polymer layer of said cushion comprises a foam layer.

4. The method of claim 1, wherein the cushion comprises a weight of 3 to 30 oz per square yard, of which 0.25 to 2.5 oz per square yard is reinforcing scrim layer.

5. The method of claim 1, wherein the reinforcing scrim layer is selected from a group consisting of fiberglass fibers, polymer fibers, and combinations thereof.

6. The method of claim 1, wherein bonding the cushion to the extruded polymer secondary backing comprises compressing the multi-layer construction between nip rollers.

7. The method of claim 1, further comprising chilling the multi-layer construction.

8. The method of claim 1, wherein extruding the polymer secondary backing comprises extruding a polyolefin-based resin, wherein the polyolefin-based resin comprises between about 10-40 wt % polyolefin and between about 20-80 wt % of a filler material.

9. A method of manufacturing a carpet tile, the method comprising:
providing a facecloth having first and second faces, wherein the facecloth comprises a primary backing having a plurality of face yarns extending through the primary backing;
providing a cushion, wherein the cushion comprises a reinforcing scrim layer embedded within a polymer layer, wherein the reinforcing scrim layer comprises a nonwoven fiber mat, and wherein the nonwoven fiber mat comprises an air-laid grid;
extruding a polymer secondary backing onto the first face of the facecloth such that a top surface of the extruded polymer secondary backing is bonded to the first face of the facecloth; and
pressing the cushion against a bottom surface of the extruded polymer secondary backing to bond the cushion to the bottom surface of the extruded polymer secondary backing such that the cushion defines at least a portion of a bottom surface of the carpet tile.

10. The method of claim 9, further comprising applying a pre-coat layer to the first face of the facecloth such that the pre-coat layer is between the extruded polymer secondary backing and the first face of the facecloth.

11. The method of claim 9, wherein the reinforcing scrim layer is selected from a group consisting of fiberglass fibers, polymer fibers, and combinations thereof.

12. The method of claim 9, wherein the polymer secondary backing and the cushion form a backing construction having a weight between about 23-60 ounces per square yard.

13. The method of claim 9, wherein the facecloth comprises a primary backing web having a weight of between about 18-40 ounces per square yard.

14. The method of claim 13, wherein the extruded polymer secondary backing has a weight of between about 15-30 ounces per square yard.

15. The method of claim 14, wherein the carpet tile has a weight of between about 50-96 ounces per square yard.

16. A method for removing moisture from beneath a carpet tile, the method comprising:
placing a carpet tile upon a moisture-bearing subsurface, wherein the carpet tile comprises:
a facecloth comprising a primary backing and a plurality of face yarns extending through the primary backing, wherein the facecloth defines an upper surface of the carpet tile;
an extruded polymer secondary backing layer having a top surface bonded to the facecloth and an opposite bottom surface; and
a cushion bonded to the bottom surface of the extruded polymer secondary backing, said cushion comprising a reinforcing scrim layer embedded within a polymer layer; and
wherein the cushion defines at least a portion of a bottom surface of the carpet tile; and
wherein the extruded polymer secondary backing layer allows at least a portion of the moisture in the subsurface to be wicked away from the subsurface and released through a seam of the carpet tile.

17. The method of claim 16, wherein the cushion comprises a weight of 3 to 30 ounces per square yard, of which 0.25 to 2.5 ounces per square yard is the weight of the reinforcing scrim layer.

18. The method of claim 16, wherein the reinforcing scrim layer is selected from a group consisting of fiberglass fibers, polymer fibers, and combinations thereof.

19. The method of claim 16, wherein the carpet tile has a weight of between about 50-96 ounces per square yard.

* * * * *